United States Patent [19]

Schatz

[11] Patent Number: 4,680,932
[45] Date of Patent: Jul. 21, 1987

[54] APPARATUS FOR SUPERCHARGING AN INTERNAL COMBUSTION ENGINE

[76] Inventor: Oskar Schatz, Tellhohe 14, D-8031 Stockdorf, Fed. Rep. of Germany

[21] Appl. No.: 856,797

[22] Filed: Apr. 28, 1986

Related U.S. Application Data

[63] Continuation of Ser. No. 609,928, May 14, 1984, abandoned.

[30] Foreign Application Priority Data

May 18, 1983 [DE] Fed. Rep. of Germany ....... 3318093
May 18, 1983 [DE] Fed. Rep. of Germany ....... 3318094

[51] Int. Cl.$^4$ ............................................. F02B 37/00
[52] U.S. Cl. ...................................................... 60/605
[58] Field of Search .......................... 60/597, 598, 605; 417/380, 404

[56] References Cited

U.S. PATENT DOCUMENTS 4,211,082 7/1980 Bristol .................................. 60/605

FOREIGN PATENT DOCUMENTS

781987 3/1935 France .................................. 60/605
638923 6/1950 United Kingdom.
815494 6/1959 United Kingdom.

Primary Examiner—Michael Koczo
Attorney, Agent, or Firm—Harness, Dickey & Pierce

[57] ABSTRACT

A method for the introduction of air into the cylinder of an IC engine, wherein the air is introduced from a displacement supercharger into the engine cylinder till the desired pressure in the cylinder has been produced, wherein the expulsion motion of the piston or pistons of the positive displacement supercharger is so synchronized with the piston motion of the engine cylinder to be supplied by same that the air displaced from the supercharger flows directly into the respective engine cylinder. An IC engine for use in the method has at least one piston, that moves in a cylinder having an air inlet, and a positive displacement supercharger joined outputwise with the air inlet of the engine and having at least one supercharging chamber. The air pumping volume of the supercharger chamber or of the supercharger chambers, is equal to the maximum amount of air needed in the engine cylinder to be charged, and there is such a synchronization between the positive displacement supercharger and the motion of the engine piston that the supercharger expels and compresses the air towards the air inlet when the engine piston is performing the suction stroke. As further possibility the air pumping volume of the supercharger chamber or of the supercharger chambers is equal to the maximum amount of air needed in the engine cylinder to be charged, in addition to an amount of air drawn in by the engine piston for compression to the charging pressure, and a synchronization between the positive displacement supercharger and the motion of the engine piston may be so adjusted that the positive displacement supercharger introduces the maximum desired additional amount of air into the engine cylinder while the piston is moving near bdc.

2 Claims, 9 Drawing Figures

APPARATUS FOR SUPERCHARGING AN INTERNAL COMBUSTION ENGINE

This is a continuation of application Ser. No. 609,928, filed May 14, 1984 entitled "An Apparatus for Supercharging an Internal Combustion Engine," now abandoned.

BACKGROUND AND SUMMARY OF THE INVENTION

The invention relates to a method for introducing air into the cylinders of an internal combustion (IC) engine, and particularly to charging the cylinder using a displacement supercharger until the desired filling pressure has been reached, and to an engine adapted to use in the method.

Conventional superchargers have been either of the positive displacement or the non-positive displacement type. In the case of a positive displacement supercharger, the operating rate of pumping is a product of the speed of the engine and the displaced volume of the supercharger pumping element. A small displacement of the supercharger may be compensated for by operation at a high speed. Much the same applies for non-positive displacement superchargers, the speed of rotation of an exhaust gas driven turbo-charger being for example about 250,000 rpm, while the engine speed is only 4,000 rpm.

In so-called supercharging a supply of compressed air is produced by a compressor and stored in a storage means. Air flows into the engine cylinder from the storage means every time the cylinder inlet valve is opened. Such a method of supercharging has a relatively high energy requirement, because the energy needed for expulsion of the compressed air into the storage means is many times greater than the energy needed for the compression itself.

For this reason the theory of so-called delayed supercharging has been elaborated, in which a part of the air is drawn in by the piston in the cylinder and another part of the air is compressed by a compressor and expelled into a storage means so that at the right point in time towards the end of the suction stroke of the engine cylinder in question compressed air is transferred through a separate air duct into the cylinder when a pulse generating valve is opened, such air then compressing the air already in the engine cylinder to the required degree. For this to be possible, it is necessary for the additional air to be compressed in relation to the desired filling pressure in the cylinder and furthermore work is preformed in expelling the air into the storage means, although such energy requirement represents an improvement over the so-called supercharging. A further shortcoming is the complex structure in the form of the additional air duct and the means for timing the valve. In addition, the action of expelling the air involves losses, that on the one hand give rise to a still further increase in the energy requirement and on the other hand make their contribution to further heating of the combustion air. More specially in this case of four stroke gasoline engines this makes it necessary means for cooling the combustion air and high drive powers for the supercharging devices that are usually mechanically driven. For this reason delayed supercharging has not come to be accepted in the art.

The object of the invention is to reduce the driving power of the supercharger and limit the increase in temperature during compression to the theoretical minimum. In other words the work needed for expulsion is to be no longer necessary or is to be reduced as far as possible and the costs of producing the system are to be kept low.

In the invention this object is effected by synchronizing the expelling motion of the piston or pistons of the positive displacement supercharger with the motion of the pistons of the engine cylinders to be filled such that the air displaced from the supercharger directly transfers into the engine cylinders in question.

By the method in accordance with this invention, it is no longer necessary for work to be performed for expulsion of the air into the intermediate storage means and it is no longer necessary for there to be compression to a level materially above the pressure in the engine cylinder. There is furthermore no need for the second air duct. The system adopted for causing synchronization between the piston motion of the supercharger and the motion of the piston of the engine is simple.

In keeping with a useful form of the invention, at the beginning of inlet into the engine cylinder, the combustion air flows into the cylinder under atmospheric pressure from the supercharger into the said cylinder and has its pressure gradually increased to the desired filling pressure.

The work performed for filling the cylinder may be still further cut down if, in keeping with a further useful form of the invention, a part of the air to be supplied to the cylinder is drawn in by the piston of the engine and another part thereof is supplied into the cylinder during motion of the piston near bdc (bottom dead center) by the supercharger. In this respect the inlet may be shut if desired for the combustion air after the piston has gone past tdc (top dead center).

In order to perform the method the invention comprises an IC engine, that has at least one piston, moving in a cylinder having an air inlet, and a positive displacement supercharger having an output port thereof joined with the air inlet of the engine, said supercharger having at least one supercharging chamber. In keeping with a first possible form of the invention, the air pumping volume of the supercharger chamber or of the supercharger chambers, is equal to the maximum amount of air needed in the engine cylinder to be charged, and in that there is such a synchronization between the positive displacement supercharger and the motion of the engine piston, that the supercharger expels and compresses the air towards the air inlet when the engine piston is performing the suction stroke.

In a further possible for of the invention the air pumping volume of the supercharger chamber or of the supercharger chambers is equal to the maximum amount of air needed in the engine cylinder to be charged, in addition to an amount of air drawn in by the engine piston for compression to the charging pressure, and in that a synchronization between the positive displacement supercharger and the motion of the engine piston may be so adjusted that the positive displacement supercharger introduces the maximum desired additional amount of air into the engine cylinder while the piston is moving near bdc.

In keeping with a useful form of the invention, the positive displacement supercharger is arranged to be driven by the exhaust gas from the engine; in this respect a further useful development of the invention is possible if the exhaust gas inlet of the positive displacement supercharger is directly connected with the outlet valve of the engine cylinder supplying the exhaust gas. However it also possible for an exhaust gas collector to be placed on the upstream side of the exhaust gas inlet of the positive displacement supercharger and for the exhaust gas side of the supercharging chamber or chambers to be furnished with a pulse controller or generator.

As part of a further useful development of the invention, the positive displacement supercharger is drivingly connected with the crankshaft of the engine and as a further highly useful form of this arrangement there is a belt drive between the crankshaft of the engine and the displacement supercharger such that the ratio between the driving and slack sides of the belt may be varied.

Further useful developments will be seen from the dependent claims in conjunction with the specification. A detailed account of the invention will now follow based on the working examples of the invention to be seen in the figures.

DETAILED DESCRIPTION OF THE INVENTION

To make possible a better understanding of the workings of the invention reference should be had to FIGS. 4 to 7 for comparison with known methods. In these diagrams, the volume of the supercharging chamber is in each case marked off along the horizontal axis, the air requirement in all examples amounting to 1.5 liters and the volume of the combustion space to be charged amounting to 1 liter so that the desired compression is 1.5 to 1. Dead space in the system is neglected. Pressure is marked along the vertical graph axis, the pressure P1 being atmospheric pressure and pressure P2 being the charging pressure in the engine cylinder. On the horizontal axis UT represents bdc, viz. the position of the displacement supercharger, in which the supercharging chamber is at its greatest volume within its working cycle, and OT marks the tdc, viz. the position of the positive displacement supercharger in which the supercharging chamber has the smallest volume within its working cycle.

Figure 4:
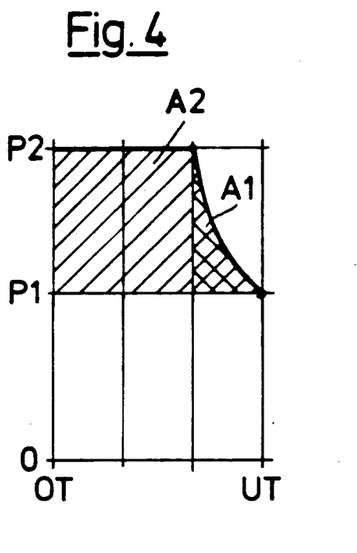
FIG. 4 is a diagram of conventional supercharging.

The graph of FIG. 4 represents motion and changes in pressure in the case of conventional supercharging. In this case the combustion air is firstly compressed from the atmospheric pressure P1 to the supercharging pressure P2 and then forced out of the positive displacement supercharger into an intermediate storage device (air manifold or distributor), whence the compressed air then flows into the engine cylinder. In the plot of the pressure changes it is assumed that the storage means is infinitely large for simplification so that the pressure P2 is kept constant after the compression.

In FIG. 4 there is no direct relationship between the timing of the compression stroke of the supercharger and the suction stroke of the engine piston, because the air will have reached its cylinder-filling pressure before any flow into the engine cylinder occurs. It will be seen that there is a relatively small amount A1 of the work to be performed, i.e. the compression work, and a relatively large amount A2, that represents the work needed to expel the compressed air out of the supercharger into the buffer formed by the intermediate storage means or air manifold, which will generally have a capacity of several times the displacement of one engine cylinder or a supercharger chamber respectively. In the supercharging operation in FIG. 4 the compressed air makes its way into the engine cylinder right from the start of the suction stroke, i.e. as from the opening of the inlet valve, a part of the work needed for expulsion being exerted on the engine piston.

Figure 5:
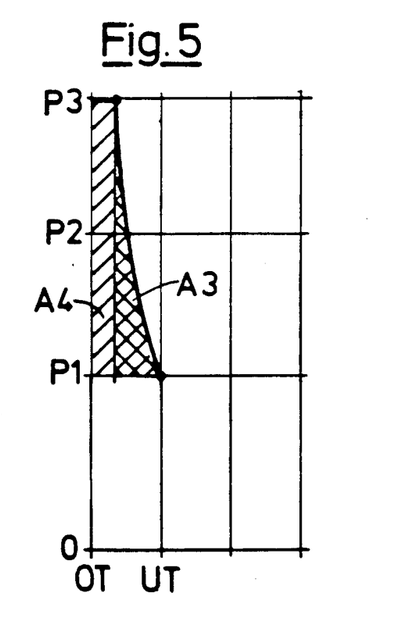
FIG. 5 is a diagram of so-called delayed supercharging known as a theoretical possibility.

FIG. 5 shows operation of a method of delayed supercharging known as a theoretical possibility. In this case it is only the volume equal to the difference between the desired air requirement and the volume of the engine cylinder to be supercharged that is compressed by the positive displacement supercharger. However this differential volume has to be compressed to a high pressure P3 and it is expelled at this high pressure into a storage means, the work of compression being denoted A3 and the work of expulsion being denoted A4. The compressed air goes out of the storage means towards the end of the suction stroke after the opening of a timing valve and passes into the engine cylinder.

Figure 6:
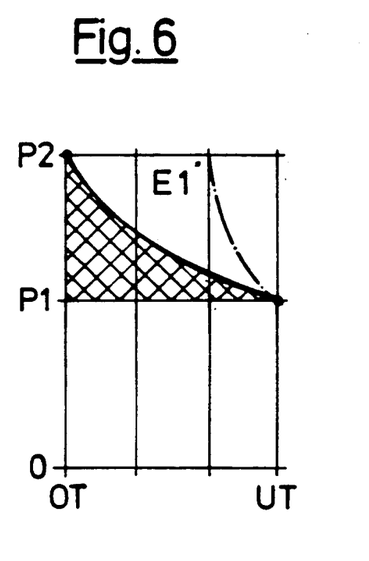
FIG. 6 is a diagram of a first form of the method of the invention.
Figure 7:
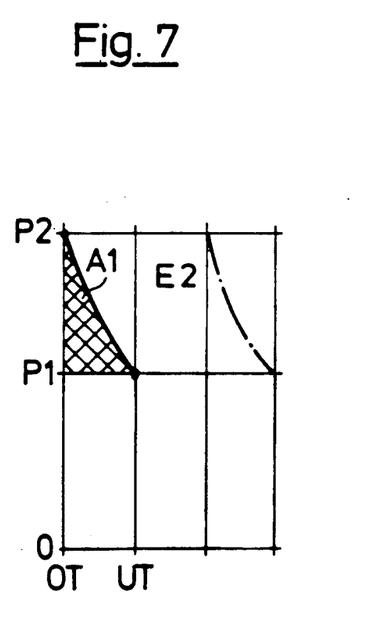
FIG. 7 is a diagram of a second form of the method of the invention.

No synchronization between the motion of the positive displacement supercharger and the piston of the engine cylinder to be filled is necessary or made possible in the supercharging operation according to FIG. 4 or in the case of conventional delayed supercharging as in FIG. 5. The useful effects of the invention stem from such synchronization that is so designed that the air displaced from the supercharger flow directly—without any intermediate storage means—into the engine cylinder. FIGS. 6 and 7 will show two different forms of this method of operation.

In the method illustrated in FIG. 6, the expulsion and compression stroke of the positive displacement supercharger lasts generally for the whole duration of the suction stroke of the engine piston. The combustion air is drawn in by the piston moving in the cylinder and concurrently with this the air is expelled from the positive displacement supercharger, and because of the larger displacement of the supercharger, said air is at the same time compressed from the atmospheric pressure P1 to the final supercharging pressure P2, for which reason this form of the method will be termed "concurrent supercharging".

In the case of such concurrent supercharging, the air volume pumped by the positive displacement supercharger is equal to the volume pumped in conventional supercharging as represented in FIG. 4, with the difference however that the supercharging pressure P2 is only reached at the end of the compression stroke of the positive displacement supercharger, that is to say tdc, coinciding in time with the end of inlet into the engine cylinder in question. As will be seen from a comparison between FIGS. 4 and 6, the amount of work performed is very much less. The saving in work is marked E1. There is a beneficial effect to be gained in this respect, if the piston of the positive displacement supercharger has a certain lag and if the inlet valve of the engine cylinder is only closed after the engine piston has already gone through its bdc. This makes it possible for further work to be saved for driving the compressor, because the pressure in the supercharger chamber firstly remains at atmospheric pressure and only goes up to the necessary charging pressure p2 later when the engine piston is in the vicinity of bdc.

FIG. 7 shows a method which represents a still further improvement, in which the air also flows directly out of the positive displacement supercharger into the engine cylinder and in which the energy requirement is reduced still further. In this method the engine piston firstly draws in air at atmospheric pressure without, for the moment, any combustion air from the positive displacement supercharger being compressed and expelled. It is only when the piston in the engine cylinder is near bdc, i.e. shortly before the inlet is shut, the differential volume is propelled by the positive displacement supercharger directly into the engine cylinder in order to bring the drawn-in air that is still at atmospheric pressure up to the desired charge pressure P2. Unlike delayed supercharging known as a theoretical possibility, as in FIG. 5, the compression of the differential air volume in this case is strictly timed in relation to the piston motion in the engine cylinder and forced directly out of the positive displacement supercharger into the combustion chamber, for which reason this supercharging method is to be termed "direct delayed supercharging".

As will be seen from a comparison between FIGS. 4 and 7, it is during the compression stroke in the case of direct delayed supercharging that the compression work marked A1 in FIG. 4 is performed, such work causing the pressure in the engine cylinder to go up to the charging pressure. The saving in work as compared with conventional supercharging is marked as E2 and in amount is quite the same as the expulsion work marked A2 in FIG. 4. In this method of operation the driving power needed for the supercharging device is—as may be theoretically proved—about 18% of the driving power, which is needed, if the charging air as in FIG. 4 is first compressed, expelled into a buffer and then makes its way into the cylinder.

Figure 1:
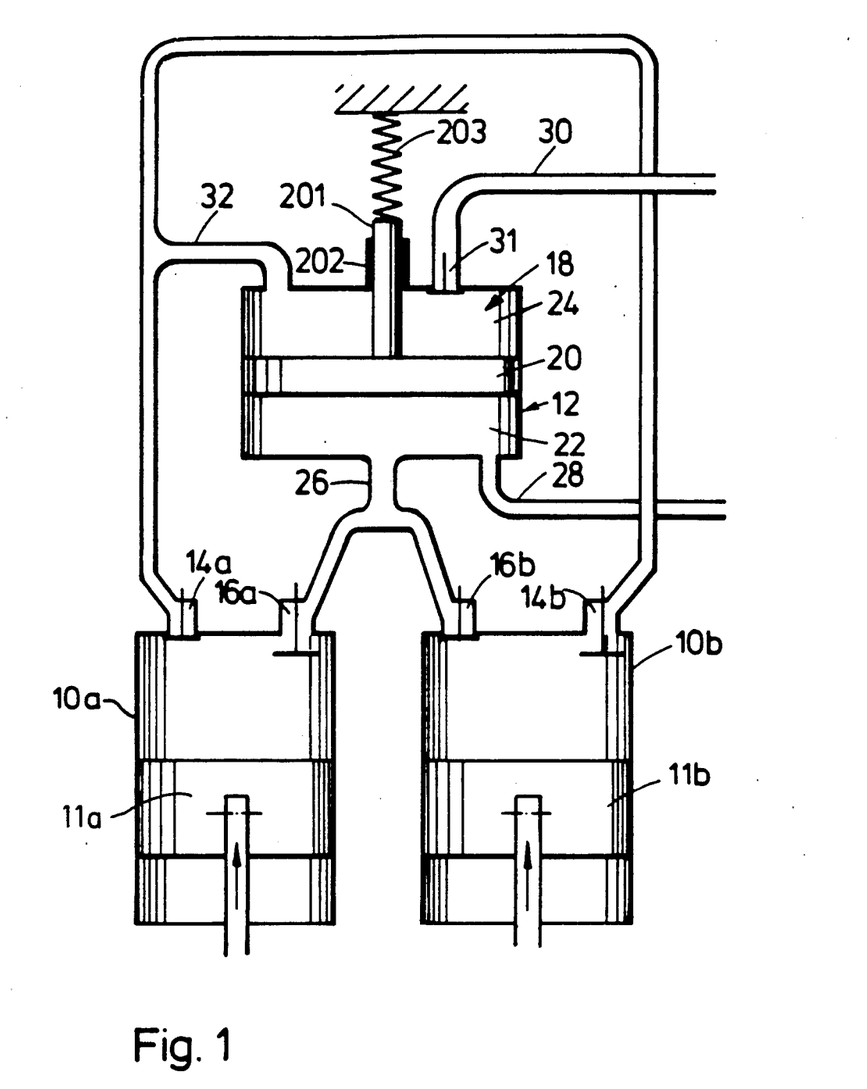
FIG. 1 is a diagrammatic view of a four stroke engine having two cylinders joined to a positive displacement supercharger for use in the method of the invention.

FIG. 1 diagrammatically shows a four stroke engine, that is represented by two cylinders 10a and 10b. These cylinders each have an air inlet 14a and 14b and an exhaust gas outlet 16a and 16b. Between the two cylinders 10a and 10b there is an exhaust gas driven supercharger 12, in which one charging chamber 18 is separated by partition 20 functioning as a piston, into an exhaust gas chamber 22 and a charging air chamber 24. The exhaust gas chamber 22 has an exhaust gas inlet 26 and an exhaust outlet 28, the exhaust inlet 26 being joined with the exhaust outlet 16a of the cylinder 10a and the exhaust outlet 16b of the cylinder 10b, whereas the exhaust outlet 28 of the exhaust chamber 22 is joined up with the exhaust system of the engine. The charging air chamber 24 has a charging air inlet 30, with a check valve 31 therein, and a charging air outlet 32, that is joined up with the air inlet 14a of the cylinder 10a and the air inlet 14b of the cylinder 10b. Thus, as can be seen in FIG. 1, the supercharger 18 and cylinders 10a and 10b comprise a parallel circuit for introducing air into the cylinders.

The partition 20 is guided by the guide rod 201 in the guide 202. The return spring 203 acts on the guide rod 201 and so counteracts the pressure of the exhaust gas. This makes certain that on the arrival of the exhaust gas pulse the partition 20 is in every case at bdc of the charging air chamber 24. The spring 203 may be so designed that the length of stroke of the partition 20 is in line with the intensity of the exhaust gas pulse so that it is possible to adapt the pumped flow of the charging air chamber 24 to the load of the engine.

For the "concurrent supercharging method" the pumped flow volume of the supercharger 12 will be so large that it just satisfies the maximum air requirement of the cylinder 10a or 10b for one cycle.

For example, on the motion of the piston 11b in the cylinder 10b from tdc to bdc with the air inlet 14b opened, air is drawn in though the air inlet 30 of the supercharger 12. By correct timing at the start of the suction stroke of the piston 11b, viz. on opening of the air inlet 14b of the cylinder 10b, the partition 20 is acted upon by a pressure pulse from the exhaust gas outlet 16a of the cylinder 10a shown in FIG. 1 and is pushed upwards so that the air inlet 30 is at once closed by its check valve 31 and all the air requirement of the cylinder 10b is satisfied from the charging air chamber 24 of the supercharger 12, the motion of the partition 20 increasing the pressure of the charging air till the end of the operation up to the valve P2, as is marked in FIG. 6. The counter pressure being built up, reinforced by the return spring 203 eventually moves the partition 20 back again so that the exhaust gas is expelled from the exhaust gas chamber 22 through the exhaust outlet 28 into the exhaust system. At the same time air is drawn into the charging air chamber 24 again through the charging air inlet 30, the respective check valve 31 opening.

In the case of "direct delayed supercharging" the exhaust gas pulse from the exhaust gas outlet 16b of the cylinder 10a is so timed that it only gets to the partition 20 when the piston 11b is in the vicinity of bdc in the transition between the suction and compression strokes. The piston 11b therefore draws in air at atmospheric pressure P1 through the charging air inlet 30, the charging air chamber 24 and the charging air outlet 32. When eventually the partition 20 (FIG. 1) is moved upwards, the check valve shuts off the charging air inlet 30 and the pressure in the cylinder 10b is made to go up from the pressure P1 to the pressure P2, this all taking place during a relatively small angular crank displacement and corresponding motion of the piston 11b, see FIG. 7.

Figure 2:
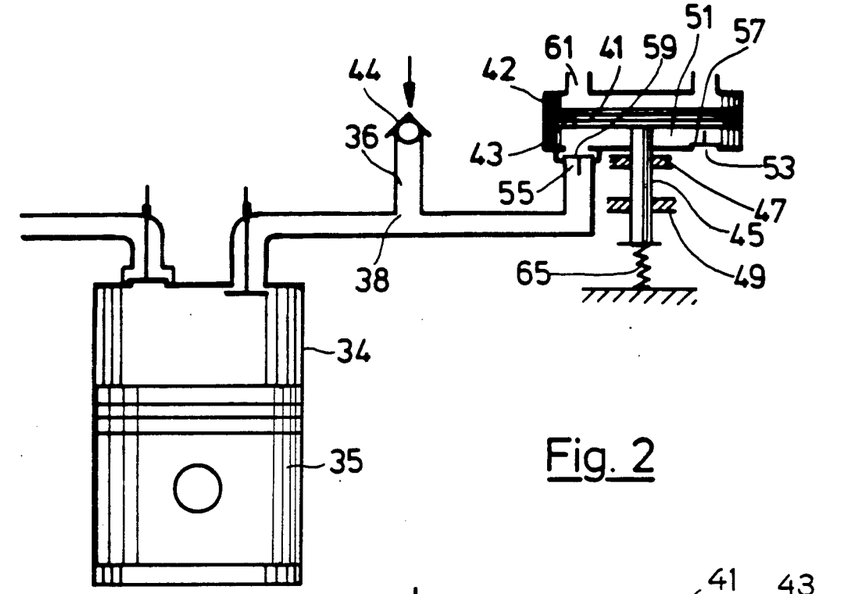
FIG. 2 is a diagrammatic view of an engine cylinder with a positive displacement supercharger have flat pistons.

In the further form of the invention to be seen in FIG. 2, there is only one engine cylinder 34 to be seen, that corresponds to the cylinder 10b of FIG. 1. The cylinder 34 has a piston 35, that is joined by a connecting rod 37 with the crankshaft 39 of the engine. In this form of the invention the exhaust gas supercharger 42 is joined up by way of a branch 38 with the intake duct 36 having a check valve 44 upstream from said branch 38 so that direct suction intake is possible bypassing the supercharger 42.

The positive displacement supercharger 42 is in the form of a short-stroke flat piston supercharger, whose piston 41 functioning as a partition has a piston rod 45 running out of the housing 43 of the supercharger 42, said rod 45 being guided by guides 47 and 49 outside the housing 43 in the direction of the motion of the piston. The guide play and the length of the guiding effect are in this respect such that apart from a possibly present sealing element, the piston is able to be moved without contact in the housing 43. The outcome of this is that there is a very compact, low-price manner of construction with a high efficiency. The charging air chamber 51 of the supercharger 42 is fitted with check valves 57 and 59 at the air inlet 53 and and the air outlet 55 respectively, it however being possible to do without the check valve 59 at the air outlet 55. The design in keeping with FIG. 2 may also be used for "concurrent supercharging" or for "direct delayed supercharging". In the case of concurrent supercharging the pressure of the exhaust gases moving through an exhaust gas inlet 61 into an exhaust gas chamber 63 of the supercharger causes the piston or the partition 41 to be moved down in terms of FIG. 2, whereas the engine piston 35 is performing its suction stroke. In the case of direct delayed supercharging, the exhaust gas pulse only comes into being when the engine piston 35 is in the vicinity of its bdc. After the charging stroke of the supercharger 42 the partition is moved back by a compression spring 65 acting on the piston rod 45 into the top end position of FIG. 2.

In the case of many engines the amount of space and/or the order of operation of the valve motion do not leave any possibility for running the engine directly in accordance with the above-noted manner of operation, viz. the direct use of the exhaust gas pressure wave coming from the outlet valve on the one cylinder for forcing the air into a different cylinder. It is then useful to have an exhaust gas buffer between the exhaust gas outlet of the engine cylinder and the supercharging chamber, in which case however the pulsed supply of exhaust gas to the supercharging chamber then has to be controlled, viz. the supercharging chamber is supplied with amounts of exhaust gas from the exhaust gas buffer in keeping with the desired number of strokes and the energy requirement of the compressor. Here as well it is possible to have a direct coordination in time between the compression stroke of one charging air chamber and the suction stroke of he corresponding engine cylinder. It is however furthermore possible to have an air buffer between the supercharger and the engine so that a supercharging effect similar to conventional ones is produced, the exhaust gas pulses for driving the supercharger being able to come directly from the engine or they may flow through a means for pulsed actuation.

In accordance with particular requirements the exhaust side of the supercharging chamber 18 may be fitted with an inlet and/or and outlet valve for control of the exhaust gas. The control on the exhaust side of the supercharging chamber 18 may furthermore be electronic, those in the art being aware of the means to be used for taking into account and processing the operational data of the engine, the supercharger and the like for optimizing the operation of the supercharger, such operation furthermore including control of knocking. Since these expedients are known no detailed account is needed here. This optimization may be so designed that the pressure build-up of the exhaust gases caused by the supercharging device is optimized. Electronic automatic control may furthermore beneficially change the efficiency and the behavior of the driving system while at the same time reducing costs.

Independently of the type of engine and more particularly of the maximum speed of the engine, it may be beneficial to have a supercharger joined up with a number of pairs of cylinders of a four stroke engine or with more than one cylinder of a two stroke engine. More specially in the case of multi-cylinder engines the exhaust gases from a number of engine cylinders will be introduced into a common exhaust gas collector, that then functions as a pressure equalizer and a buffer at the same time. In this respect in the case of large engines it is possible to cut down costs by supplying a number of supercharging chambers 18 from one exhaust gas collector. A more specially useful effect is to be had however in this way if the above described beneficial manner of operation with direct or individual concurrent or delayed supercharging of separate engine cylinders is used for engines with any design and any number of cylinders.

For direct or individual concurrent or delayed supercharging of the separate engine cylinders the suction motion of the engine piston 11b of the cylinder 10b to be charged is to be timed to be in accordance with the arrival of the mass of exhaust gas compressing the charging air in the supercharging chamber 18. To minimize the driving energy for the supercharging piston 20 it is beneficial in this respect if the greater part of the charging air mass flow into the engine cylinder 10b shortly before the closing of the inlet valve 14b. If in this case the supercharging chamber 18 is supplied, under the control of the outlet valve 16a of the cylinder 10a, with exhaust gas energy, it is naturally necessary to also take into account the distance to be moved by the exhaust gas between the outlet valve and the supercharging chamber.

The "concurrent supercharging" and the "direct delayed supercharging" methods described, the synchronization between the motion of the pistons of the engine and the motion of the supercharger is important. However this furthermore opens up a possibility of controlling flow by changing the phase relation between the motion of the engine and of the supercharger. This is more specially relevant for the regulation of flow of a mechanically drive supercharger as represented for example in FIG. 3, since it is then possible to dispense with the otherwise necessary flow control or regulation system, that is very complex in the case of mechanical superchargers, by varying the stroke or speed.

Figure 3:
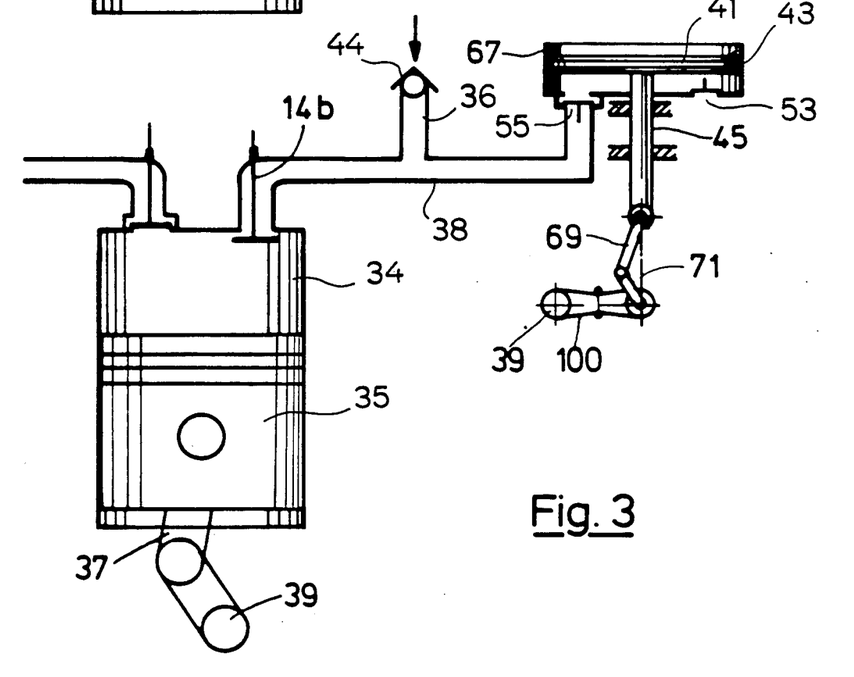
FIG. 3 is a view like that of FIG. 2 of an engine that is furnished with a positive displacement supercharger driven from the engine crankshaft.

The supercharger of FIG. 3 differs from the supercharger 42 driven by exhaust gas as in FIG. 2 inasfar as the exhaust gas chamber 63 is dispensed with and the piston rod 45 is joined by a crank 69 with a crankshaft 71, that for its part is driven from the engine crankshaft from the engine crankshaft 39, the belt drive generally referenced 100 having a means to change the phase relation between the engine crankshaft 39 and the crank 71 driving the supercharger 67. This means will be described in more detail using figures 8 and 9.

In the engine cylinder 34 (see FIG. 2) the full charging amount is reached in the case of "direct delayed supercharging" when the increase in pressure caused by the supercharger 67 at the maximum supercharging pressure is precisely timed to be synchronized with the closing of the inlet valve 14b on the engine cylinder 34. If the point in time at which the supercharger completes its pumping stroke is varied in relation to the "optimum" point in time, at which the inlet valve shuts, the cylinder would no longer reach the maximum pressure P2, viz. the amount charged would be less.

In this respect the supercharger may be advanced or retarded in relation to the motion of the engine piston 35. If the supercharger comes to the end of its pumping stroke before the inlet valve 14b shuts, the suction by the engine piston 35 and the pumping of air by the supercharger 67 will overlap to a greater degree and the overall amount of air drawn in by the engine cylinder 34 during the stroke will correspondingly be cut down. If the supercharger comes to the end of its pumping stroke after the closing of the inlet valve 14b, it will no longer be possible for the full pumped volume of the supercharger to get into the engine cylinder 34 and the degree of filling will again be less. However in this case in the final phase of the pumping stroke the supercharger will firstly be performing useless work. The pressure built up in the intake duct of the engine as a result may however be useful after the opening of the inlet valve 14 in order to scavenge the engine cylinder.

If the top part of the supercharger 67 of FIG. 3 is fitted with an end wall, that has an air inlet and an air outlet, the air inlet and possibly the outlet each having a check valve, this will be a simple way of producing a second charging air chamber. It is beneficial to join each of these charging air chambers with one half of the air inlets of the engine so that interference between the charging air pulses that otherwise increases with the number of cylinders and the speed of the engine, may be decreased as a useful effect.

Figure 8:
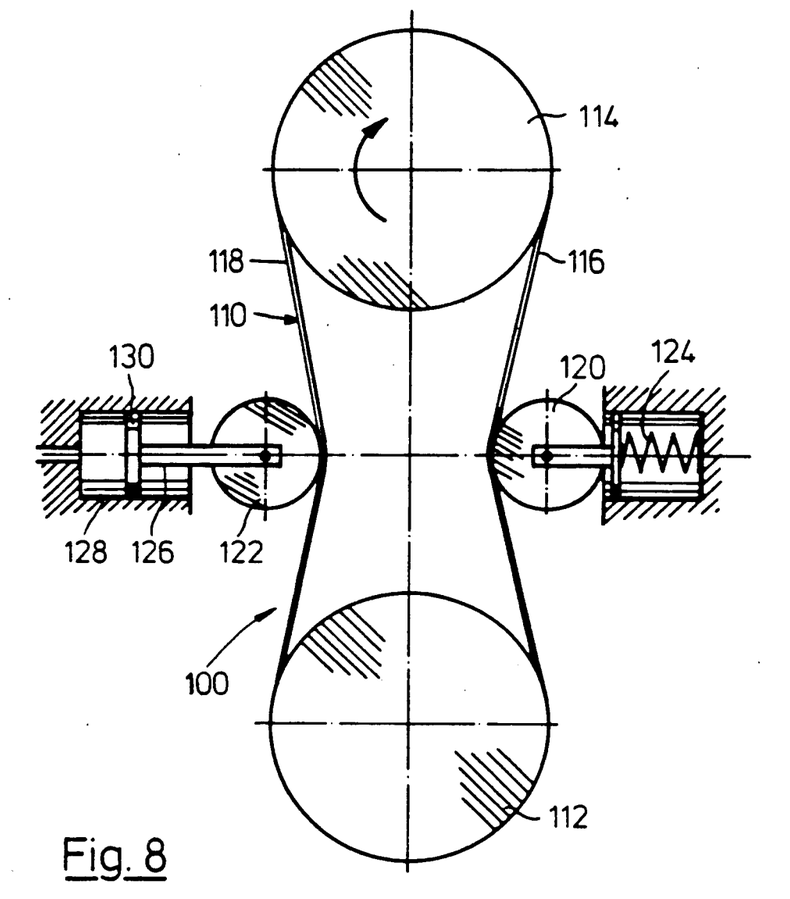
FIG. 8 is a diagrammatic side view of a first form of a belt drive that may be used in the system shown in FIG. 3.

The belt drive 100 to be seen diagrammatically in FIG. 8 comprises a belt 110, preferably a toothed one, that runs over four pulleys in all, namely a driving pulley 114, a driven pulley 112 and two further pulleys, i.e. a pulley 120 placed against the belt run moving from the driven pulley 112 to the drive pulley 114 and able to be moved in a direction normal to the direction of motion of the belt, and furthermore a pulley 122 that may be adjusted in a direction across the direction of belt motion. In other words, the pulley 120 is on the return run 116 of the belt 110 and the pulley 122 is on the driving run 118 of the belt 110. This arrangement is an efficient one because the pulley 120 is pressed by a spring 124 against the belt 110 in order to keep up the desired belt tension. If (in a case in which the pulley 120 were to run on the driving run of the belt) it were possible for the pulley 120 to flutter somewhat transversely in relation to the direction of the motion of the belt independently of any motion caused by an adjustment of the pulley 122, the engagement of the pulley 120 with the driving run would cause small uncontrolled changes in length of the driving run and for this reason a departure from absolutely regular running of the driving pulley 114 and of the driven pulley 112.

On the other hand the pulley 122 may be positively and definedly adjusted in its position normal to the direction of running of the belt 110, the pulley 122 being here mounted in a piston rod 126, that is joined with the piston 130 sliding in a cylinder 128, such piston being able to be acted upon on both sides hydraulically, i.e. the cylinder 128 with the piston 130 is a double acting hydraulic actuator which may be used for exact adjustment of the position of the pulley 122. Hydraulic operation makes possible a simple regulation of the phase of the belt drive as a function of externally ascertained parameters, for example the operating data of the motor vehicle and of its IC engine.

If the pulley 122 in FIG. 8 is moved to the right, the driving belt run 118 becomes longer, whereas the return run 116 is representatively shortened so that the driven pulley is advanced in relation to the driving pulley. If the pulley 122 is moved in the opposite direction, the driving belt run 118 will gradually move into its shortest, straightened position, which is preferably such as to represent a retard of the driven pulley 122 in relation to the driving pulley 114, whereas the phase shift of zero should be roughly in the middle between the two positions of the pulley 122 if the possibility both of an advance and of a retard is desired. The arrangement is such, in the case of both working examples, that in the one end position of the adjustable pulley 122 the one belt run 116 or 118 runs in a straightened condition and the respective other belt run 118 or 116 will then have its maximum deflection out of the straightened position. Keeping to this stipulation variations in the placing of the pulleys 120 and 122 are possible. For example, in FIG. 8 the pulley 120 might be placed on the other side of the belt, although then the belt run 116 would have to be pressed thereby not to the left but to the right out of the straightened position. In the arrangement of FIG. 8 the spring 124 has to compensate the adjustment motion of the pulley 122. In the case of the working example of FIG. 9 this is not necessary so that in this case one may have a smaller, stiffer spring.

Figure 9:
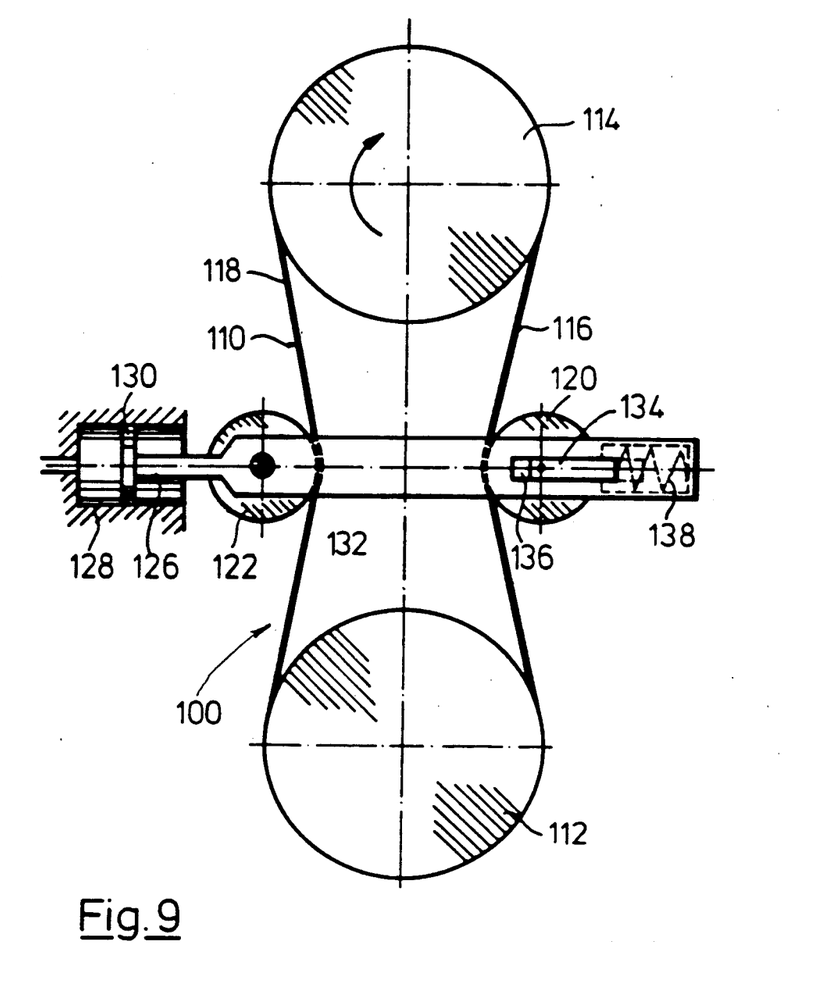
FIG. 9 is a diagrammatic side view of a second possible form of such a belt drive.

In the working example of FIG. 9 the piston rod 126 is joined to a bearing element 132, on which the pulley 122 is journalled so that the motion of the pulley is limited to a rotary one. The pulley 120 is supported in a slide 134, that may be shifted to a limited degree in the bearing element 132 transversely in relation to the direction of the belt 110, to which end there may be guide slots 136 for mounting the slide 134. The slide 134 is loaded in the bearing element 132 by way of a spring 138. This spring functions generally to keep up the tension of the belt 110 at the desired level.

If the piston 130 is moved, the pulleys 120 and 122 are moved as well. Since the two pulleys 120 and 122 contact the same face of the belt 110, the one belt run 116 is lengthened by roughly the same amount as the amount by which the other belt run 118 is shortened and the other way round. Slight departures, that occur on leaving the symmetrical position of the two lengths 116 and 118, may be allowed for by the spring 138.

The manner of operation would be the same if the two pulleys 120 and 122 were to be placed on opposite respective sides of the belt, it only being necessary in this case to adopt the arrangement as described at the end of the account of FIG. 8. If one keeps to this condition, i.e. that in the one end position the one belt run is straightened and the other is deflected to the maximum degree and the other way round, it would be possible, getting the same useful effects as regards the size of the spring 138, for the pulley 120 also to be mounted with the help of the slide 134 in a bearing element which would be driven in the opposite direction to the piston rod 126 and the pulley 122 bearing thereon, even although this arrangement would seem to be of lesser utility because of the more complex mechanical design. However it will be clear that the teaching of the invention may be put into practice in a number of very different ways and is not limited to the examples explained herein.

To be able to adjust the belt tension, it is preferred that the force of the spring 124 or 138 be adjustable, as is known in connection with belt drives.

Preferably the supercharger 12 or 42 is fitted with a means for damping the motion of the partition 20 or 41, for example in the form of a hydraulic damper.

What is claimed is:

1. The combination of an internal combustion engine and a positive displacement supercharger, said engine of the type having at least two cylinders having a reciprocating piston movable between top dead center and bottom dead center positions comprising:

said positive displacement supercharger having a housing defining a chamber and a single movable piston therein dividing said chamber into an exhaust gas chamber and an air charging chamber, said exhaust gas chamber and said air charging chambers communicating with both of said engine cylinders such that in a first operational occurrence of said supercharger, exhaust gases in said exhaust gas chamber from the first of said cylinders bias said supercharger piston to compress air in said air charging chamber such that air is directed to the second of said cylinders when said piston of said second cylinder is moving between said top dead center and said bottom dead center position and in a second operational occurrence of said supercharger, exhaust gases in said exhaust gas chamber from said second of said cylinders bias said supercharger piston to compress air in said charging chamber such that air is directed to said first cylinder when said piston of said first cylinder is moving between said top dead center and said bottom dead center positions, said first and second operational occurrences alternating during operation of said supercharger, and said exhaust gas biasing being timed to provide compressed air to said cylinders at a point where said piston cylinders are near said bottom dead center position.

2. The combination according to claim 1 further comprising a parallel circuit for the introduction of air into said cylinders at atmospheric pressure.

* * * * *

UNITED STATES PATENT AND TRADEMARK OFFICE
CERTIFICATE OF CORRECTION

PATENT NO. : 4,680,932

DATED : July 21, 1987

INVENTOR(S) : Oskar Schatz

It is certified that error appears in the above-identified patent and that said Letters Patent is hereby corrected as shown below:

Column 1, line 30, after "supercharging", insert --,--.

Column 2, line 51, "for" should be --form--.

Column 3, line 2, after "it", insert --is--.

Column 3, line 27, "have" should be --having--.

Column 3, line 61, delete "its" (second occurrence).

Column 5, line 14, "p2" should be --P2--.

Column 6, line 21, "though" should be --through--.

Column 7, line 10, delete "and" (third occurrence).

Column 7, line 44, "he" should be --the--.

Column 7, line 54, "and" (second occurrence) should be --an--.

Signed and Sealed this

Fifth Day of April, 1988

*Attest:*

*Attesting Officer*

DONALD J. QUIGG

*Commissioner of Patents and Trademarks*